United States Patent [19]

Feng

[11] Patent Number: 5,084,982
[45] Date of Patent: Feb. 4, 1992

[54] COMBINED VERNIER GAUGE AND PROTRACTOR

[76] Inventor: Yee-Chang Feng, 2F., No. 166-5, Hsi Twen Road Sec. 3, Tai Chung City, Taiwan

[21] Appl. No.: 594,926

[22] Filed: Oct. 10, 1990

[30] Foreign Application Priority Data

Jun. 9, 1990 [TW] Taiwan ................................ 79206290

[51] Int. Cl.$^5$ .................................................. G01B 5/14
[52] U.S. Cl. ............................................ 33/810; 33/403; 33/1 N; 33/534
[58] Field of Search ................... 33/403, 415, 416, 417, 33/424, 426, 806, 810, 811, 812, 481, 795, 801, 1 N, 534

[56] References Cited

U.S. PATENT DOCUMENTS

| 878,439 | 2/1908 | Wagniere | 33/810 X |
| 1,040,214 | 10/1912 | Kranz | 33/415 |

FOREIGN PATENT DOCUMENTS

0097228  7/1898  Fed. Rep. of Germany ........ 33/810

*Primary Examiner*—Harry N. Haroian
*Attorney, Agent, or Firm*—Varndell Legal Group

[57] ABSTRACT

A combined vernier gauge and protractor includes a primary rule having thereon a regular scale, a secondary piece slidable on the primary rule, and a protractor having a straight side pivotally mounted on and alongside the secondary piece. Such a device is provided in order that it can both provide the functions of a vernier gauge and a protractor. The secondary piece includes a vernier scale capable of cooperating with the regular scale to enable the present device to have a more accurate measurement.

8 Claims, 9 Drawing Sheets

COMBINED VERNIER GAUGE AND PROTRACTOR

BACKGROUND OF THE INVENTION

The present invention relates to a measuring tool, and more particularly to a vernier gauge and/or protractor.

The vernier gauge is widely used in order to enable the user to have a more accurate measurement. The protractor is also extensively put into use to allow the user to know how many degrees an angle of an angular piece is. It is often found, e.g. in the work for quality control that the worker needs to separately or alternately measure the length and the angle of one or more parts of one or more articles. It is troublesome and/or inconvenient for the worker to frequently change the instrument for measurement. The invention deals with the above situation encountered by the prior art.

SUMMARY OF THE INVENTION

It is therefore an object of the present invention to provide a combined vernier gauge and protractor.

It is further an object of the present invention to provide a combined vernier gauge and protractor capable of simultaneously measuring two angles.

According to the present invention, a combined vernier gauge and protractor includes a primary rule having thereon a regular scale, a secondary piece slidable on the primary rule and having thereon a vernier scale, and a protractor having a straight side pivotally mounted on and alongside the secondary piece.

Certainly, the combined vernier gauge and protractor can further includes a sleeve extended from the straight side and having an inner guiding piece, a hollow shaft member received in the sleeve and including a first end having a female thread guidedly receiving therein the guiding piece and a second opposite annularly toothed end, and a needle being toothed to mesh with the second end.

The present invention may best be understood through the following description with reference to the accompanying drawings, in which:

DETAILED DESCRIPTION OF THE PREFERRED EMBODIMENT

Figure 1:
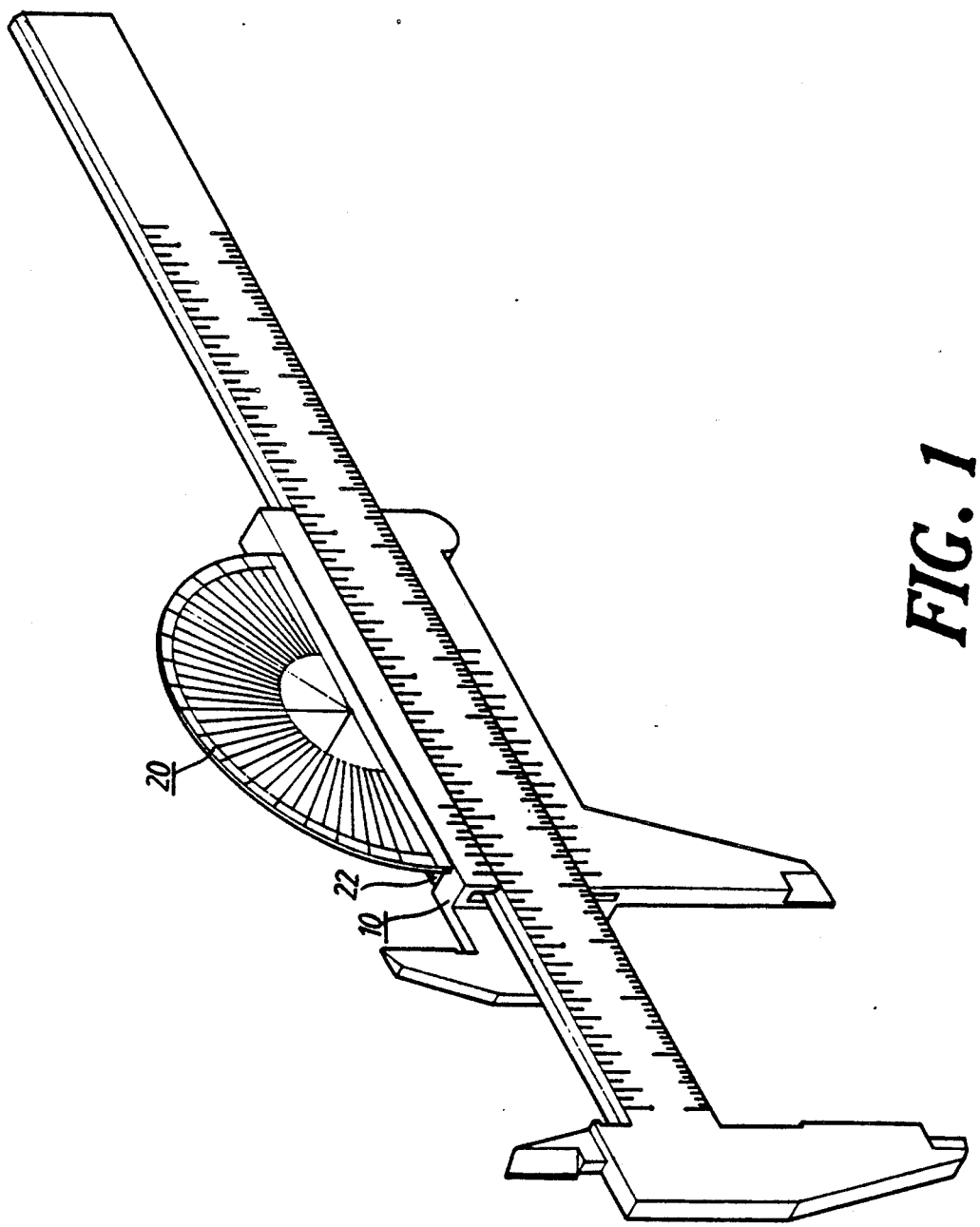
FIG. 1 is a perspective view showing a preferred embodiment of a combined vernier gauge and protractor according to the present invention.
Figure 2:
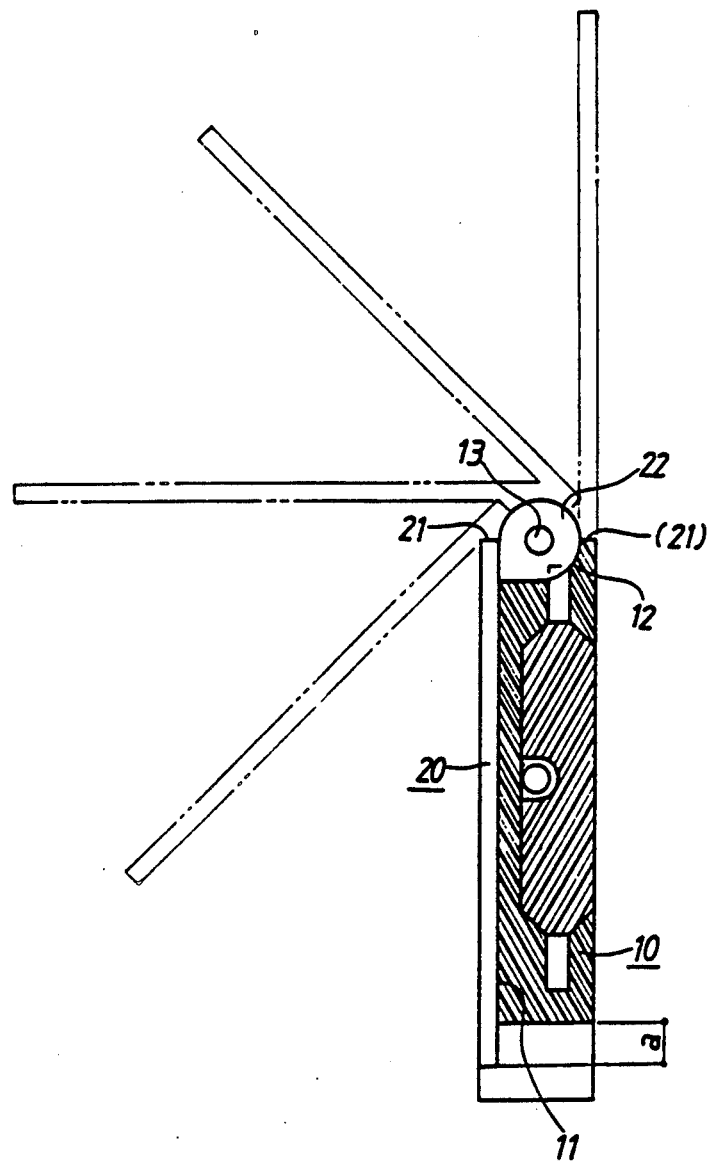
FIG. 2 is a schematically sectional view showing a combined vernier gauge and protractor in FIG. 1.

Referring now to FIGS. 1 and 2, a combined vernier gauge and protractor according to the present invention includes a primary rule having thereon a regular scale, a secondary piece 10 slidable on the primary rule and having thereon a vernier scale capable of cooperating with the regular scale to enable the present device to have a more accurate measurement, and a protractor 20 having a straight side 21 pivotally mounted on and alongside secondary piece 10.

Secondary piece 10 has a back recess 11 capable of receiving therein protractor 20 having an extending sleeve 22 extended from straight side 21, and a top groove 12 capable of pivotally receiving therein sleeve 22 so that a pin 13 can be provided to pivotally connect together protractor 20 and secondary piece 10. Protractor 20 further includes a semi-circular side having a radius larger than a regular width of secondary piece 10 so that the user can easily turn protractor 20 upwardly and/or downwardly. When protractor 20 is turned down or up against secondary piece 10, they 10, 20 will respectively form a flush surface at the back or the front of secondary piece 10.

Figure 3:
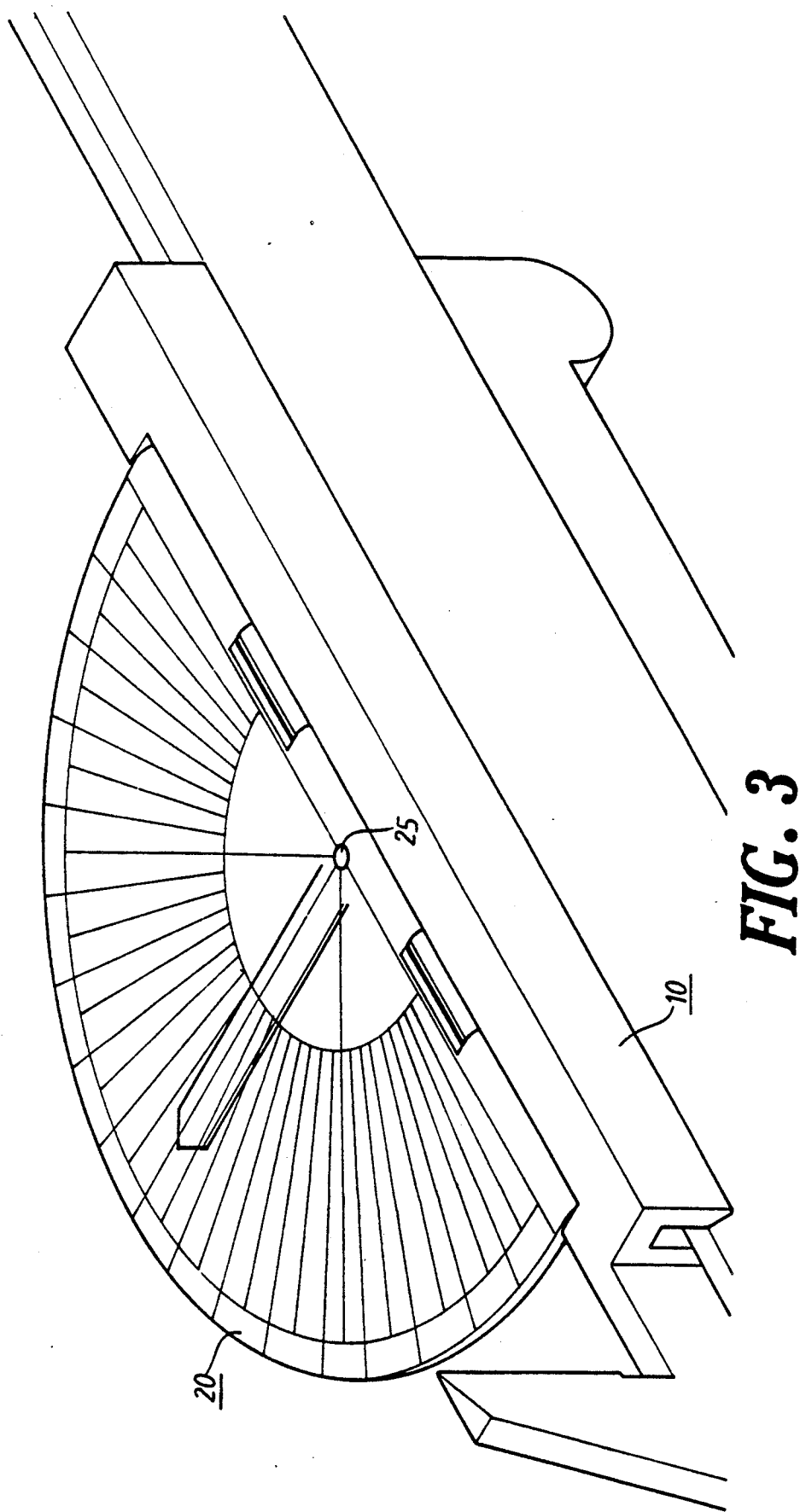
FIG. 3 is a partly perspective view showing a second preferred embodiment of the present invention.
Figure 4:
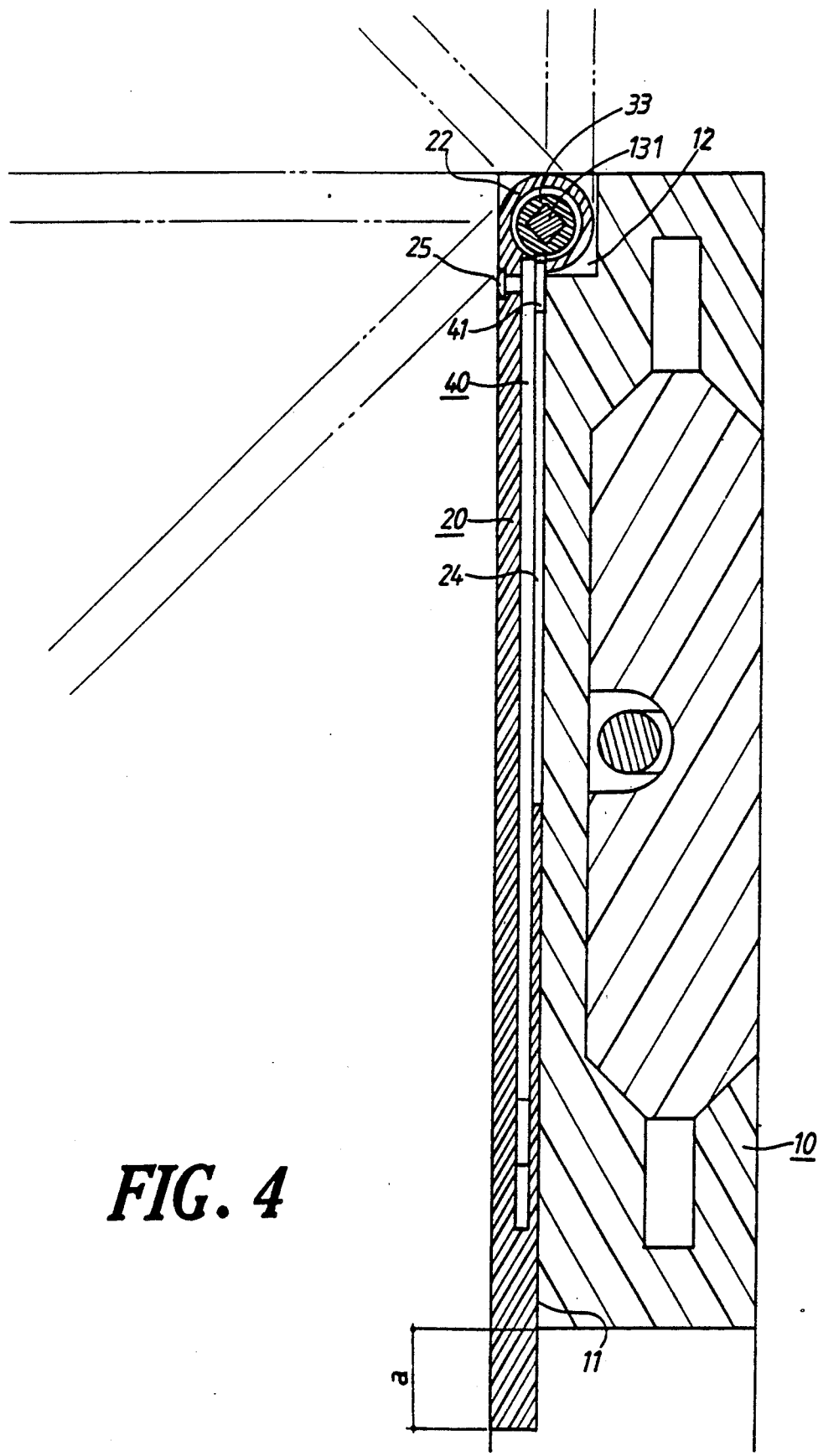
FIG. 4 is a schematically sectional view showing the combined vernier gauge and protractor in FIG. 3.
Figure 5:
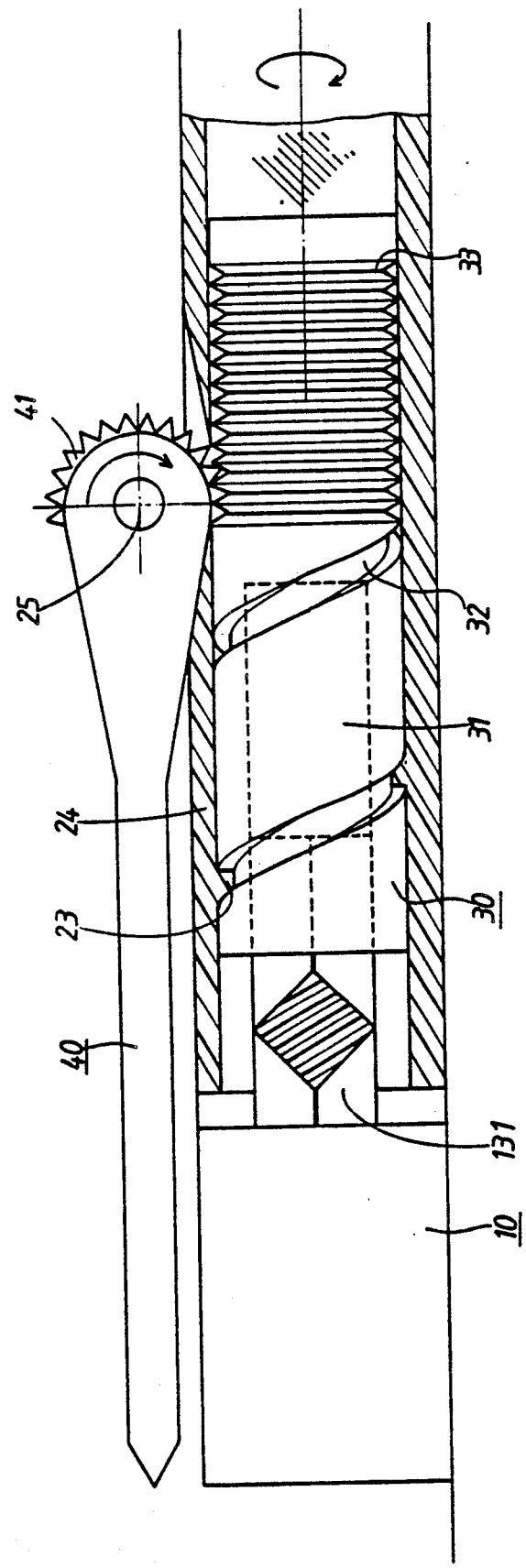
FIG. 5 is a partly sectional view showing the combined vernier gauge and protractor in FIG. 3.

As shown in FIGS. 3-5, a second preferred embodiment of the present combined vernier gauge and protractor bears a resemblance to the first preferred embodiment above described, but includes a shaft member 30 having a hollow chamber 31 and slidably received in sleeve 22. Shaft member 30 has a first end provided with a female thread 32 guidedly receiving therein an inner guiding piece 23 of sleeve 22, and a second opposite annularly toothed end 33 meshing with a toothed bottom 41 of a needle 40 which is receivable in a needle, space 24 provided in protractor 20 and is pinned to the circular center of protractor 20 by a pin 25. A limiting piece 131 extended from secondary piece 10 is inserted into hollow chamber 31 for limiting the sliding range of shaft member 30 in sleeve 22 so that when shaft member 30 slides in sleeve 22 from a positional limit to an opposite positional limit, toothed end 33 will rotate needle 40 by an angle of 180 degrees. Protractor 20 is transparent, and needle 40 will indicate on the protractor the angle included between the protractor and the secondary piece 10. This is because of the fact that when protractor 20 is turned upwardly or downwardly with respect to secondary piece 10, guiding piece 23 in sleeve 22 will slide shaft member 30 in sleeve 22.

Figure 6:
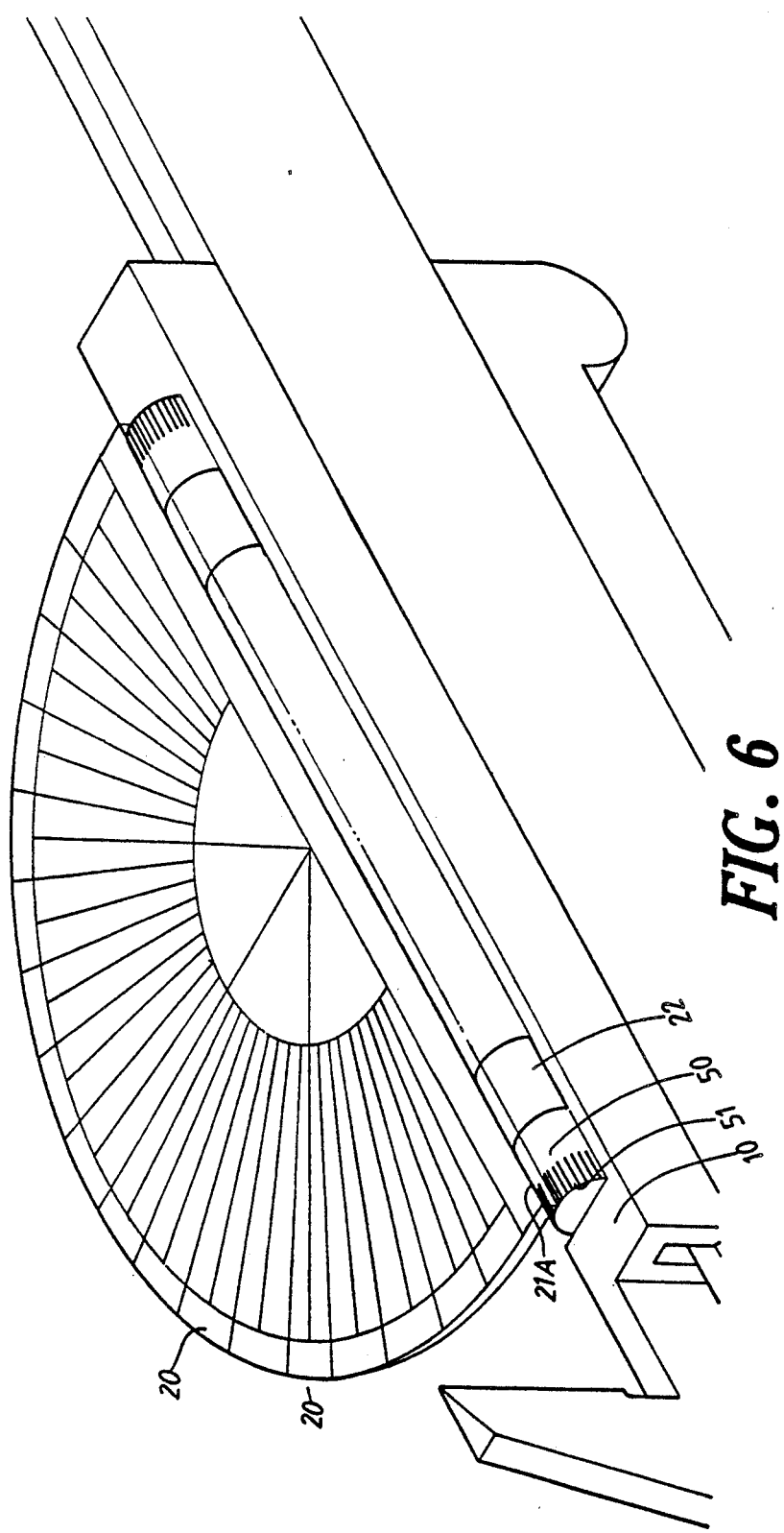
FIG. 6 is a partly perspective view showing a third preferred embodiment of the present invention.
Figure 7:
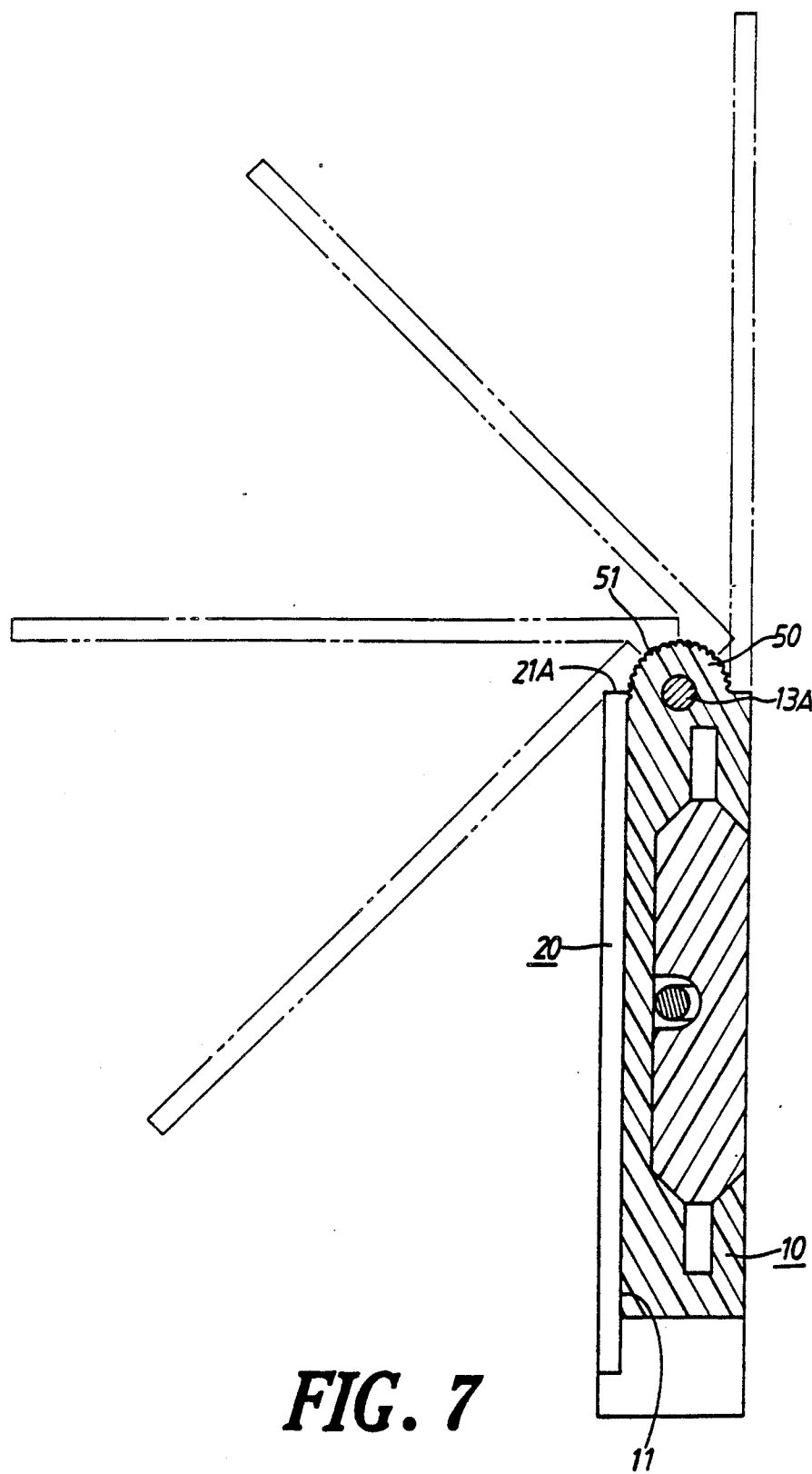
FIG. 7 is a schematically sectional view showing the combined vernier gauge and protractor in FIG. 6.

As shown in FIGS. 6 and 7, a third preferred embodiment of the present combined vernier gauge and protractor differently includes a pin 13A pinning together sleeve 22 of protractor 20 and an end sleeve 50 which is extended from secondary piece 10 and has a toothed portion 51 meshing with a toothed end 21A of the straight side of protractor 20 so that when protractor 20 is turned with respect to secondary piece 10, protractor 20 is turned with respect to secondary piece 10, protractor 20 will stop at the position to which protractor 20 is turned through the engagement of toothed portion 51 and toothed end 21A so that an accurate measurement at some circumstances is made possible.

Figure 8:
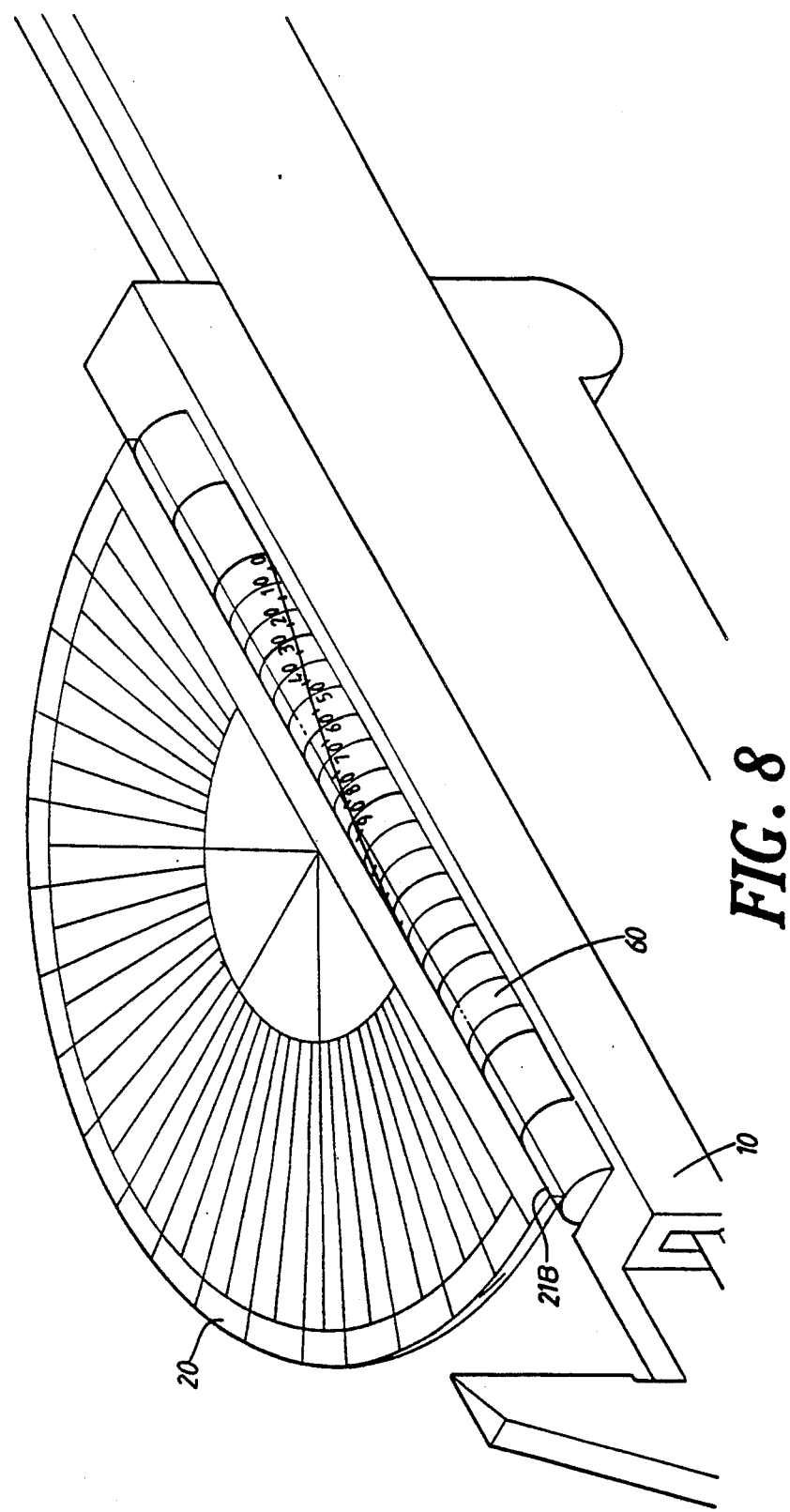
FIG. 8 is a partly perspective view showing a fourth preferred embodiment of the present invention.

As shown in FIG. 8, a fourth preferred embodiment of the present combined vernier gauge and protractor differently includes two end sleeves extended from the straight side of protractor 20, and a graduated sleeve 60 which is extended from secondary piece 10 and is positioned between the two end sleeves of protractor 20 so that a front ridge 21B of the straight side of protractor 20 will point on sleeve 60 how many degrees the angle included by protractor 20 and secondary piece 10 is.

Figure 10A:
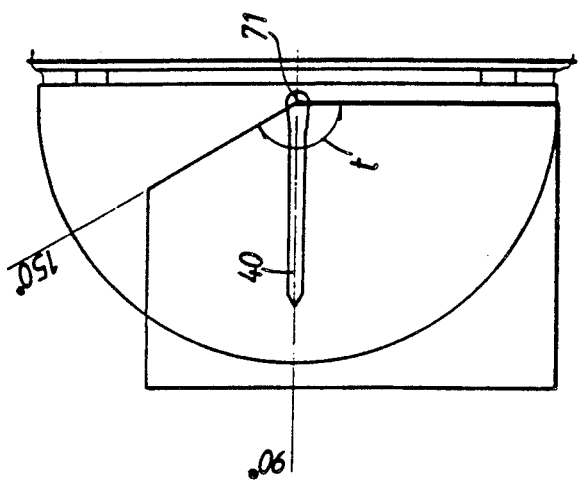
FIGS. 10A and 10B are schematical views showing the present combined vernier gauge and protractor simultaneously measuring two angles of the article shown in FIG. 9.
Figure 10B:
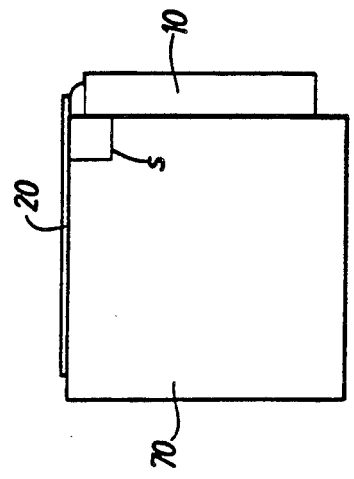
Figure 9:
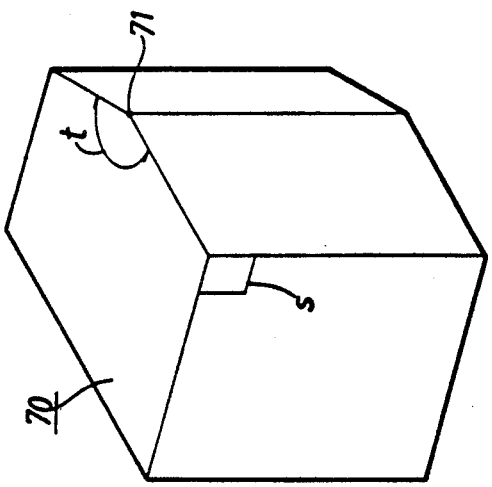
FIG. 9 is a perspective view showing an article to be measured by the present invention.

As shown in FIGS. 9–10B, the present combined vernier gauge and protractor can simultaneously measure two dimensionally different angles s, t of an article 70 in that after the user has suitably turned up protractor 20, he can vertically coincide the circular center of protractor 20 with the measuring point 71 of article 70 and can allow secondary piece 10 and protractor 20 to respectively contact against the relevant surfaces of article 70. Now, he can obtain the degrees of the angle s by the needle 40 and protractor 20 and the degrees of the angle t from the protractor 20.

I claim:

1. A combined vernier gauge and protractor comprising a primary member having thereon a regular scale, a secondary member slidably mounted on said primary member and having thereon a vernier scale capable of cooperating with said regular scale to enable said combined vernier scale and protractor to have a more accurate measurement, and a protractor having a straight side portion, said straight side portion being pivotally mounted on said secondary member.

2. A combined vernier gauge and protractor as defined in claim 1 including a sleeve extending from said straight side portion, a guide member extending inwardly from said sleeve, a hollow shaft member having opposite ends and being slidably supported within said sleeve, said shaft member having a female thread on a first end for receiving said guide member, a limiting member connected to said secondary member and inserted into said shaft member to limit sliding movement of said shaft member relative to said sleeve, a needle supported for pivotable movement relative to said protractor, and connecting means for connecting the opposite end of said shaft member with said needle so that the needle pivots relative to the protractor upon sliding movement of said shaft.

3. A combined vernier gauge and protractor as defined in claim 2 wherein said protractor is formed of transparent material, said connecting means including annular teeth formed on said opposite end of the shaft and cooperating teeth formed on said needle.

4. A combined vernier gauge and protractor as defined in claim 2 wherein said needle is pivotally supported by said protractor at the mid-point of said straight side portion.

5. A combined vernier gauge and protractor as defined in claim 1 including a first sleeve extending from said straight side portion, a second sleeve extending from said secondary member, and means connecting said first sleeve to said second sleeve so that said first sleeve can rotate with respect to said second sleeve.

6. A combined vernier gauge and protractor as defined in claim 5 wherein including first tooth means formed on said second sleeve, second tooth means formed on said straight edge portion, said first and second tooth means meshing with one another.

7. A combined vernier gauge and protractor as defined in claim 1 including a pair of spaced end sleeves extending from said straight side portion, a central sleeve extending from secondary member, said central sleeve being disposed between said end sleeves, and means connecting said central sleeve and said end sleeves so that said end sleeves can rotate with respect to said central sleeve.

8. A combined vernier gauge and protractor as defined in claim 7 wherein said central sleeve is provided with an angular scale thereon, said straight side portion aligning with said angular scale to depict an angle of said protractor with respect to said secondary member.

* * * * *